(12) United States Patent
Maekawa et al.

(10) Patent No.: US 8,192,819 B2
(45) Date of Patent: Jun. 5, 2012

(54) INFORMATON RECORDING MEDIUM AND MANUFACTURING METHOD OF THE SAME

(75) Inventors: Ippei Maekawa, Gunma (JP); Tomonori Endo, Gunma (JP); Mamoru Uchida, Gunma (JP); Yuki Takei, Gunma (JP); Yuaki Shin, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 743 days.

(21) Appl. No.: 12/327,749

(22) Filed: Dec. 3, 2008

(65) Prior Publication Data

US 2009/0169798 A1 Jul. 2, 2009

(30) Foreign Application Priority Data

Dec. 27, 2007 (JP) ................................ 2007-335539

(51) Int. Cl.
*B32B 3/02* (2006.01)
(52) U.S. Cl. .................. 428/64.1; 428/64.4; 430/270.14
(58) Field of Classification Search ................... 428/64.4
See application file for complete search history.

(56) References Cited

U.S. PATENT DOCUMENTS

2005/0025912 A1 2/2005 Takeda
2006/0165905 A1* 7/2006 Ose et al. ...................... 427/377

FOREIGN PATENT DOCUMENTS

| JP | 2001-047734 A1 | 2/2001 |
| JP | A-2006-102993 | 4/2006 |
| JP | A-2006-260748 | 9/2006 |
| JP | 2007-223118 A | 9/2007 |

OTHER PUBLICATIONS

Notice of Reasons for Refusal issued by Japanese Patent Office, mailed Apr. 11, 2012, for the Japanese counterpart application.

* cited by examiner

*Primary Examiner* — Elizabeth Mulvaney
(74) *Attorney, Agent, or Firm* — Law Office of Katsuhiro Arai (57) ABSTRACT

Disc-shaped information recording medium comprising optical penetrating substrate having colored underlayer and ink receipt layer in this order on the principal surface of one side of the substrate, wherein the ink receipt layer contains inorganic fine particles, a binder, and a crosslinking agent, and wherein a pore diameter distribution of a gap of the ink receipt layer has a maximum peak in the range of 30 nm or more when the ink receipt layer is measured with a mercury porosimetry method. Since the shrinkage force functioning in the pores of the gaps of the ink receipt layer weakens, a disc-shaped information recording medium having a reduced occurrence of warp is provided.

20 Claims, 3 Drawing Sheets

INFORMATON RECORDING MEDIUM AND MANUFACTURING METHOD OF THE SAME

BACKGROUND OF THE INVENTION

1. Field of the Invention

The present invention relates to a disc-shaped information recording medium comprising an optical penetrating substrate having a colored underlayer and an ink receipt layer in this order on the principal surface of one side of the substrate, and a method for manufacturing the same.

2. Description of the Related Art

CD (Compact Disc) has spread in the field of audios. Further, with the prevalence of personal computers, CD-ROM for read-only, write once type CD-R capable of recording information only one time on one area, and CD-RW capable of rewriting information records any number of times are used as optical media for the storage of data.

CD-ROM comprises, for example, a transparent substrate having a diameter of 120 mm and a thickness of 1.2 mm, on which pit rows are formed by a track pitch of 1.6 μm, and has storage capacity of about 650 M-byte, and information is reproduced by irradiation with laser beams having wavelengths of from 770 to 790 nm at a constant linear velocity of from 1.2 to 1.4 m/s.

With the development and practical use of short wavelength lasers in recent years, it is contrived to spread DVD (Digital Versatile Disc) capable of higher density recording and reproduction, and disc-shaped information recording media coping with HD, DVD specification and BD (Blue ray Disc) specification capable of further higher density recording and reproduction by the development and practical use of what are called violet lasers that are further shorter wavelength lasers.

Similarly to the case of CD, DVD-ROM, DVD-R, DVD+R and DVD-RW are exemplified as DVD. DVD-ROM has recording density of about six to eight times that of CD, and has construction of sticking two substrates having a thickness of 0.6 mm or so, wherein a pit is formed by track pitch of 0.74 μm, and information is reproduced by irradiation with laser beams having wavelengths of from 635 to 650 nm at a constant linear velocity of 3.5 m/s or so.

CD and CD-ROM are manufactured by using a resin such as polycarbonate and the like, and has a structure comprising a doughnut-shaped disc as the optical penetrating substrate having thereon a reflective layer formed by vapor deposition with gold, silver or aluminum, and a protective layer formed of an ultraviolet curing resin and the like on the reflective layer. For recording, rugged pit rows are formed on the surface of the optical penetrating substrate according to spiral-shaped array. These pit rows are formed in advance by a mold such as a stamper and the like at the time of forming the optical penetrating substrate, and the reflective layer is provided thereon.

The fundamental structures of DVD and DVD-ROM are the same as those of CD and CD-ROM, but the thickness of the optical penetrating substrate of DVD and DVD-ROM is half of the thickness of CD, and the thickness equal to that of CD as the thickness of the disc as a whole is secured by sticking two optical penetrating substrates half as thick as a CD to each other. For example, in the most ordinary DVD and DVD-ROM of a single-sided layer, rugged pit rows are formed on an optical penetrating substrate and a reflective layer is provided thereon, and the substrate is stuck to a substrate having no such pit rows and a reflective layer.

In recent years, in such disc-shaped information recording media, an information recording medium capable of drawing with water color ink by means of a water color ink pen and an ink-jet printer has been developed by providing a colored underlayer and an ink receipt layer receiving water color ink in this order on the side of an optical penetrating substrate opposite to the side from which record light and reproduction light are incoming. This kind of information recording media conventionally has an ink receipt layer capable of fixing water color ink on the surface of a protective layer or on the surface of a stuck substrate. Ink receipt layers are divided broadly into layers comprising an ultraviolet curing property resin capable of absorbing ink and expanding, and layers mainly comprising inorganic particles such as a pigment and a binder, and having many gaps and absorbing ink into the gaps. Many of information recording media equipped with an ink receipt layer capable of high quality drawing that is called photograph image quality have the ink receipt layer having many gaps on a colored underlayer as described above, and capable of drawing good in water resistance by absorbing the ink coated by means of a water color ink pen and an ink-jet printer into the gaps.

An example of manufacturing methods of information recording media comprising an optical penetrating substrate having a colored underlayer and an ink receipt layer in this order on the principal surface of one side of the substrate is disclosed in JP-A-2006-102993 (the term "JP-A" as used herein refers to an "unexamined published Japanese patent application"). In order to provide an information recording medium having an ink receipt layer capable of printing in high image quality, little in bleeding, and not accompanied by the occurrence of warp, in the manufacturing method of the disc-shaped information recording medium of forming the ink receipt layer by coating a coating liquid for the ink receipt layer containing fine particles, a binder and a crosslinking agent on the underlayer, the surface tension of the coating liquid for the ink receipt layer is prescribed to be $5\times10^{-2}$ N/m or less. Specifically, the coating liquid for the ink receipt layer containing vapor-phase method silica as the fine particles having an average primary particle diameter of 7 nm, polyvinyl alcohol as the binder, boric acid as the crosslinking agent, and polyoxyethylene lauryl ether as the surface active agent is coated on the underlayer of the information recording medium, and dried to form the ink receipt layer. Further, a disc-shaped information recording medium having an ink receipt layer using vapor-phase method alumina as fine particles is disclosed in JP-A-2006-260748.

As described above, in disc-shaped information recording media having a gap-type ink receipt layer on a colored underlayer, ultraviolet curing property resins or thermosetting resins are generally used as the materials of the ink receipt layer, but when a thicker ink receipt layer is formed on the colored underlayer, greater energy must be supplied at the time of ultraviolet curing or thermosetting time, and there are cases where warp and flutter of the disc-shaped information recording media are caused. If warp occurs in disc-shaped information recording media like this, there is a possibility that the recording characteristics of the disc-shaped information recording media are influenced, although it depends upon the degree of the warp.

In the background art disclosed in JP-A-2006-102993, a wetting property of the pore surfaces of the gaps is improved by the addition of a surface active agent to the coating liquid for ink receipt layer to restrain the occurrence of warp of the disc-shaped information recording media, but it has been difficult to stably obtain restraining effect of warp dependent on preservation conditions.

SUMMARY OF THE INVENTION

As a result of intensive studies by the present inventors, it has been found that shrinkage force functioning in the pores of the gaps of the ink receipt layer on the underlayer weakens when the pore diameter distribution of the gaps of the ink receipt layer has a maximum peak in the range equal to or greater than the value of a prescribed diameter. An object of the invention is to provide a disc-shaped information recording medium having good drawing characteristics and water resistance while being restrained in the occurrence of warp.

For achieving the above object, the invention can provide a disc-shaped information recording medium comprising an optical penetrating substrate having a colored underlayer and an ink receipt layer in this order on the principal surface of one side of the substrate, wherein the ink receipt layer contains inorganic fine particles, a binder, and a crosslinking agent, and the pore diameter distribution of the gap of the ink receipt layer has a maximum peak in the range of 30 nm or more when the ink receipt layer is measured with a mercury porosimetry method. According to the information recording medium, the shrinkage force functioning in the pores of the gaps of the ink receipt layer weakens. Since the shrinkage force functioning in the pores of the gaps of the ink receipt layer weakens according to the information recording medium of the invention, a disc-shaped information recording medium having an ink receipt layer with gaps on a colored underlayer and restrained in the occurrence of warp can be provided.

The invention can further provide a manufacturing method of an information recording medium comprising a process of forming a colored underlayer on the principal surface of one side of a disc-shaped information recording medium, and a process of forming an ink receipt layer by coating a coating liquid for ink receipt layer containing inorganic fine particles, a binder, and a crosslinking agent on the underlayer, wherein the coating liquid for ink receipt layer contains a coagulant. According to the manufacturing method, the ink receipt layer having the pore diameter distribution of the gap of a maximum peak in the range of 30 nm or more is formed on the colored underlayer. Therefore, a disc-shaped information recording medium in which the shrinkage force functioning in the pores of the gaps of the ink receipt layer weakens and the occurrence of warp is restrained can be provided.

The invention can still further provide a manufacturing method of an information recording medium comprising a process of forming a colored underlayer on the principal surface of one side of a disc-shaped information recording medium, and a process of forming an ink receipt layer by coating a coating liquid for ink receipt layer containing inorganic fine particles, a binder, and a crosslinking agent on the underlayer, wherein inorganic fine particles having an average primary particle diameter of approximately 17 nm or more are used in the coating liquid for ink receipt layer. According to the manufacturing method, the ink receipt layer having the pore diameter distribution of the gap of a maximum peak in the range of 30 nm or more is formed on the colored underlayer. Therefore, a disc-shaped information recording medium in which the shrinkage force functioning in the pores of the gaps of the ink receipt layer weakens and the occurrence of warp is restrained can be provided.

In addition to the above manufacturing methods, one embodiment of the principal manufacturing methods of the information recording media is a manufacturing method of using a coating liquid for ink receipt layer containing alumina fine particles, polyvinyl alcohol and a boron compound. According to the manufacturing method, the ink receipt layer having the pore diameter distribution of the gap of a maximum peak in the range of 30 nm or more is stably formed on the colored underlayer. Therefore, a disc-shaped information recording medium in which the shrinkage force functioning in the pores of the gaps of the ink receipt layer weakens and the occurrence of warp is restrained can be stably provided.

DETAILED DESCRIPTION OF THE INVENTION

The above objects and other objects of the invention, structural characteristics, functions and effects will be described with reference to the accompanying drawings.

Figure 1:
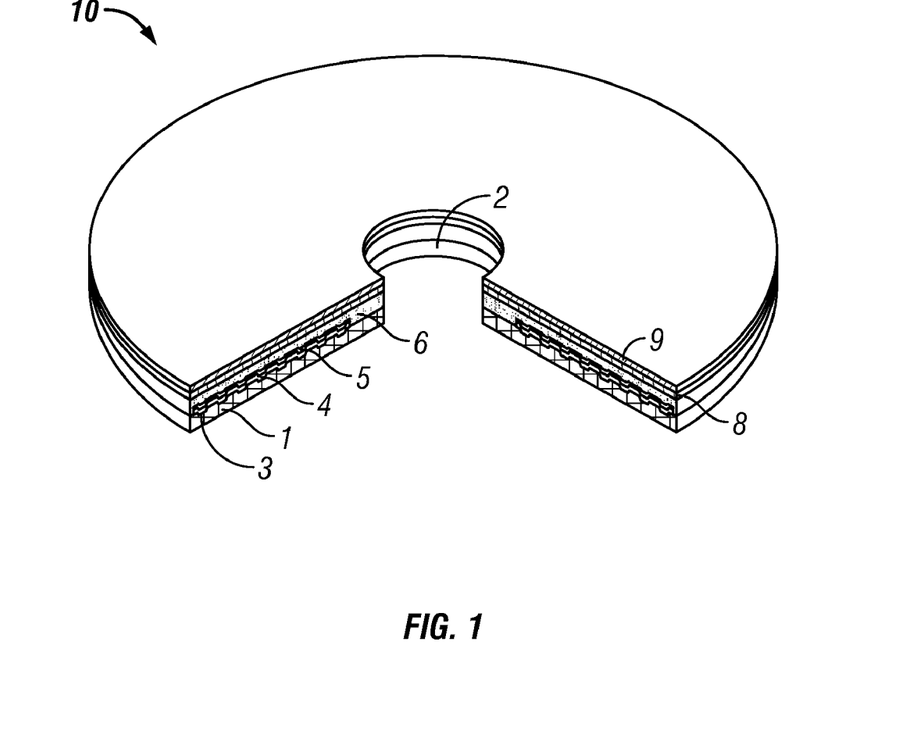
FIG. 1 is a partial cross-sectional oblique view showing the outline of internal structure of the first embodiment of the disc-shaped information recording medium according to the invention.
Figure 2:
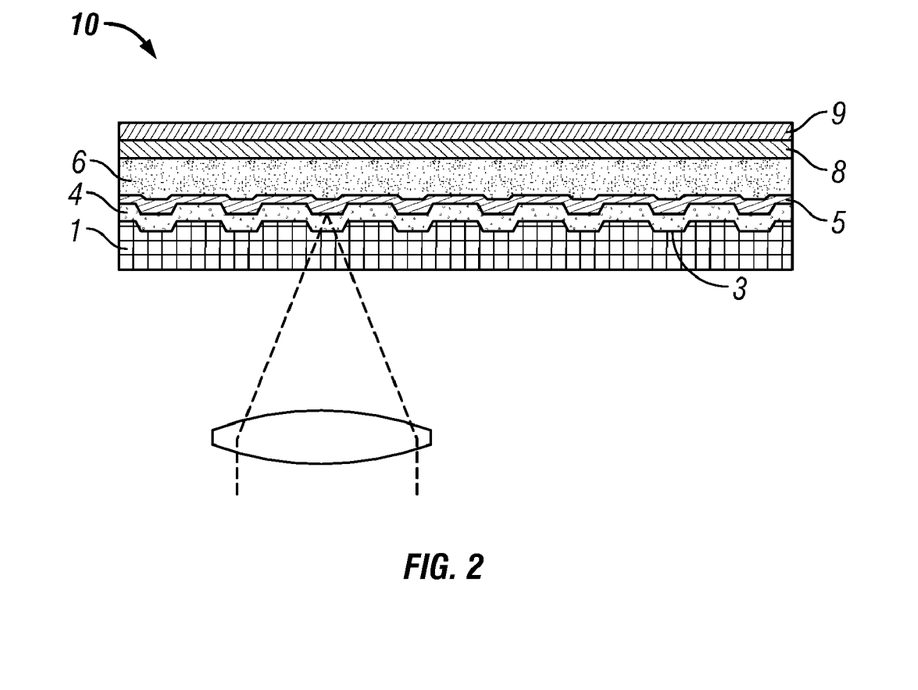
FIG. 2 is a longitudinal sectional view of the principal parts of the first embodiment.

A first embodiment of the information recording medium in the invention will be described with reference to FIGS. 1 and 2. FIG. 1 is a partial cross-sectional oblique view showing the outline of internal structure of the write once type CD (CD-R), as information recording medium 10, which is an example of a first embodiment. FIG. 2 is a longitudinal sectional view of the principal parts of information recording medium 10.

As shown in FIGS. 1 and 2, information recording medium 10 of the first embodiment is a disc-shape as a whole. Information recording medium 10 has printing part P equipped with colored underlayer 8 and ink receipt layer 9 in this order on the principal surface of one side of optical penetrating substrate 1, in the center of which is formed hole 2.

Further, ink receipt layer 9 may comprise inorganic fine particles, a binder and a crosslinking agent. When ink receipt layer 9 is measured with a mercury porosimetry method, the pore diameter distribution of the gap has a maximum peak in the range of 30 nm or more.

Optical penetrating substrate 1 may be formed of a transparent resin, for example, polycarbonate, polymethyl methacrylate (PMMA) and the like, and may be formed by injection molding. A clamping area may be provided on the outside of hole 2 of the principal surface of one side of optical penetrating substrate 1. The outer peripheral side of the clamping area is an information record region (data record region). Guide groove 3 for use as a tracking guide is formed in the data record region. The pitch of guide groove 3 may vary and is 1.6 μm in, for example, CD-R.

In the next place, a dye solution of an organic dye such as a cyanine dye or a methine dye may be coated by means of, for example, spin coating method, on the principal surface of one side of optical penetrating substrate 1 on which guide groove 3 is formed, and dried. Thus, recording layer 4 comprising an organic dye film is formed. Further, on recording layer 4 is formed reflective layer 5 which may comprise a single body metallic film of gold, aluminum, silver, copper, palladium or the like, an alloy film of each of these metals, or a metallic film comprising a trace component-containing metal of the single body metal or the alloy to which a trace component is added. Protective layer 6 may comprise an ultraviolet curing property resin layer obtained by using an ultraviolet curing property resin or the like formed all over the surface extending from the inner periphery to the outer periphery of substrate 1 so as to cover reflective layer 5. Thus, data recording part D is composed of optical penetrating substrate 1, recording layer 4 and reflective layer 5.

Recording or reproduction of data information is performed by irradiating data recording part D with laser beams from the other principal surface side of optical penetrating substrate 1, i.e. the side opposite the printing part P.

Underlayer 8 may be colored with, e.g., a pigment and a dye. In particular, when underlayer 8 is colored in white beforehand, the metallic color of lower reflective layer 5 can be hidden and the color-forming property of ink adsorbed onto ink receipt layer 9 that is laminated on the surface of underlayer 8 can be improved by the white ground, so that colors can look distinctly.

Underlayer 8 may be formed by coating a coating liquid obtained by blending fine powders of inorganic pigments, e.g., fine powder silica, talc, mica, calcium carbonate, titanium oxide, zinc white, colloidal silica, carbon black, red iron oxide, and the like, and organic materials, e.g., carboxymethyl cellulose, dextrin, methyl cellulose, and the like, as additives, with an ultraviolet curing property resin material and other resin materials, and if necessary adding thereto a solvent.

As resins to be used in underlayer 8, for example, polyethylene oxide, polyvinyl alcohol, polyvinyl methyl ether, polyvinyl formal, carboxyvinyl polymer, hydroxyethyl cellulose, hydroxypropyl cellulose, methyl cellulose, sodium carboxymethyl cellulose, and polyvinyl pyrrolidone are exemplified, and at least one of them may be used. Further, if necessary, additives such as a solvent and the like are added. In the present embodiment, underlayer 8 mainly comprises an ultraviolet curing property resin material. As the ultraviolet curing property resin materials, hydrophilic property ultraviolet curable resins obtained by blending at least one of the above resins, a photopolymerization monomer, a photopolymerization initiator, and if necessary, other additives, may be used. When a thermal polymerization initiator is used in place of a photopolymerization initiator, a thermosetting resin material can be obtained. For preparing a coating liquid, a solvent can also be added for the adjustment of the coefficient of viscosity, according to necessity.

In the present embodiment, ink receipt layer 9 contains inorganic fine particles, a binder and a crosslinking agent. In ink receipt layer 9, for example, the inorganic fine particle is alumina, the binder is polyvinyl alcohol, and the crosslinking agent is a boron compound. Ink receipt layer 9 may be formed by preparing a coating liquid by adding vapor-phase method inorganic powder, e.g., vapor-phase method alumina, to an ultraviolet curing property resin material or other resin material, and further adding other additives, and coating the resulting coating liquid on underlayer 8 by, for example, a spin coating method, and drying the coated layer. In aluminum fine particles (aluminum oxide fine particles) obtained by vaporizing aluminum chloride, metal aluminum, or the like and oxidizing the vaporized aluminum chloride, metal aluminum, or the like with oxidizing gas in a vapor-phase, the crystal type of the vapor-phase method alumina is amorphous, β-type, γ-type, δ-type, or θ-type, what is called transition alumina. With respect to other inorganic materials also, vapor-phase method inorganic fine particles (vapor-phase method metal oxide powder) can be obtained in accordance with the above method. In particular, when the crystal type of γ-type alumina particles are used as the vapor-phase method inorganic fine particles, since this crystal type has a shape suitable for adhering ink, a porous layer containing alumina fine particles of this crystal type would rapidly absorb the ink.

A coating liquid containing the vapor-phase method alumina ("vapor-phase method alumina" may be "vapor-phase method inorganic fine particles") can increase the coefficient of viscosity as compared with a coating liquid obtained by a similar method to the above method except for containing ordinary wet alumina (aqueous inorganic powder) in place of the vapor-phase method alumina, by which the thickness of a coating film can be increased by a spin coating method and capable of absorbing, retaining, and fixing inks with only the porous membrane of the coating film.

As the resin materials for use in ink receipt layer 9, for example, polyethylene oxide, polyvinyl alcohol, polyvinyl methyl ether, polyvinyl formal, carboxyvinyl polymer, hydroxyethyl cellulose, hydroxypropyl cellulose, methyl cellulose, sodium carboxymethyl cellulose, and polyvinyl pyrrolidone are exemplified, and at least one of them may be used. These resin materials are used by the addition of additives such as a solvent, according to necessity. In the present embodiment, ink receipt layer 9 is formed of a hydrophilic resin material. The hydrophilic resin materials are ultraviolet curing property resins or thermosetting resins. As ultraviolet curing resin material, hydrophilic ultraviolet curable resin obtained by blending at least one resin of the above resins, a photopolymerization monomer, a photopolymerization initiator, and further, if necessary, other additives, may also be used. When a thermal polymerization initiator is used in place of a photopolymerization initiator, a thermosetting resin material can be obtained. For preparing a coating liquid, a solvent can also be added to adjust the coefficient of viscosity, according to necessity.

Ink receipt layer 9 having the pore diameter distribution of the gap of a maximum peak in the range of 30 nm or more when the ink receipt layer is measured with a mercury porosimetry method can be formed, for example, as follows. To a coating liquid for ink receipt layer are added alumina as the inorganic fine particles, polyvinyl alcohol as the binder, a boron compound as the crosslinking agent, and further, a coagulant is added and mixed. Ink receipt layer 9 can be formed by coating a coating liquid for ink receipt layer containing the coagulant on colored underlayer 8 by means of, for example, a spin coating method, and drying the coated layer.

Ink receipt layer 9 having the pore diameter distribution of the gap of a maximum peak in the range of 30 nm or more when the ink receipt layer is measured with a mercury porosimetry method can also be formed, for example, as follows. Ink receipt layer 9 can be formed by coating a coating liquid for ink receipt layer containing alumina having an average primary particle diameter of approximately 17 nm or more as the inorganic fine particles, polyvinyl alcohol as the binder, and a boron compound as the crosslinking agent on colored underlayer 8 by means of, for example, a spin coating method, and drying the coated layer similarly to the above.

Further, in ink receipt layer 9, the vapor-phase method alumina accounts for from about 200 to about 2,000 wt % and preferably around 500 wt % ("wt %" refers to weight percent, or the percentage of the vapor-phase method alumina to the resin, not percentage accounted for in the total of both materials) is blended in the hydrophilic material and other resin material, and it is preferred to adjust the coefficient of viscosity of the coating liquid to about 300 to about 14,000 mPa·s, preferably from about 350 to about 8,100 mPa·s, and especially preferably from about 960 to about 8,100 mPa·s (adjusted in solid content (non-volatile content) of from about 10 to about 50 wt %, and the coefficient of viscosity in the environment of about 25° C. with a Brookfield B-type viscometer). The film thickness of ink receipt layer 9 is preferably about 1 μm or more, for example from about 4 or about 5 to about 100 μm, from about 4.0 to about 32 μm, or from about 10 to about 32 μm, which can be said from the facts that the image is not accompanied by bleeding and good image quality can be obtained. By these adjustments, absorption of ink can be heightened by provision of only one ink receipt layer, so that it is not necessary to form a plurality of ink receipt layers repeatedly, and an ink receipt layer formed of porous membrane excellent in absorption of ink and fixation can be formed with only one coating.

Many pores are generated in the obtained ink receipt layer 9, although not shown in the figure, and ink is absorbed into these pores (as a sponge absorbs water), and retained and fixed. The reason for the generation of these pores is presumably due to the fact that the resin shrinks during the process of drying of the coating film, in particular, during the course of curing with a curing-type resin, and gaps are generated between the fine particles such as vapor-phase method alumina.

In particular, vapor-phase method alumina fine particles are positively charged in a state of a film formed. To such vapor-phase method alumina fine particles, negatively charged ink (ink containing negatively charged particles) is used as the ink for an ink-jet method. When the ink is adhered to a porous layer containing vapor-phase method alumina fine particles, the alumina fine particles and the ink electrically pull against each other, so that the ink can be retained in ink receipt layer 9.

Ink receipt layer 9 absorbs and fixes the ink by restraining or preventing the ink from staying on the surface of the layer. For that sake, it is preferred to form a vapor-phase method alumina containing resin film having a sufficient hydrophilic property such that when water color ink is dripped on the surface of the ink receipt layer, and the ink has penetrated to the film to such a degree that the ink does not bleed even when touched with fingers 30 minutes after, little ink remains on the surface and the ink is fixed. That is to say, it is sufficient for the film to be capable of fixing ink to such a degree that the ink cannot be easily erased, not a state that the ink is merely adhered by drying of the ink.

Whether ink receipt layer 9 has water resistance or not can be judged by the above means.

The ink printed on the surface of ink receipt layer 9 fixes in the ink receipt layer without reducing an adhesion area when it is seen from the surface.

The more the content of the vapor-phase method alumina, the less is the adhesion of the surface of the resin film of the ink receipt layer, and the applied ink hardly remains on the surface, so that information recording media are not adhered even when they are piled and touched to the ink receipt layers.

The thus-formed ink receipt layer 9 in disc-shaped information recording medium 10 of the first embodiment of the invention has the maximum peak of the pore diameter distribution of the gap in the range of 30 nm or more when measured with a mercury porosimetry method. Accordingly, the invention can provide a disc-shaped information recording medium restrained in generation of warp as compared with conventional information recording media.

The measurement of the maximum peak of the pore diameter distribution of the gap of ink receipt layer 9 by a mercury porosimetry method is performed, for example, with Pore Master 60GT (PM 60GT-11, manufactured by Quantachrome Instruments) by physically peeling ink receipt layer 9 from the sample of disc-shaped information recording medium 10, and the peeled piece is measured with a mercury porosimeter. The measurement can be performed by reading the pore diameter of the maximum peak from a graph of the pore diameter distribution taking X-axis as the pore diameter and Y-axis as the pore number. In place of the peeled piece, the optical penetrating substrate on which an ink receipt layer is formed may be cut out inclusively, and the cut piece may be measured.

The camber angle of disc-shaped information recording medium 10 is measured, for example, with an optical disc camber angle automatic measuring device (S2HH-20N, manufactured by Nihondensikogaku Co., Ltd.). Specifically, another principal surface side of a sample of disc-shaped information recording medium 10 is irradiated with a laser beam white rotating the sample of disc-shaped information recording medium 10, and the light reflected from the reflective layer in the sample of disc-shaped information recording medium 10 is measured. The positional information of the reflective layer is analyzed from the result of measurement obtained, from which the camber angle can be computed.

Figure 3:
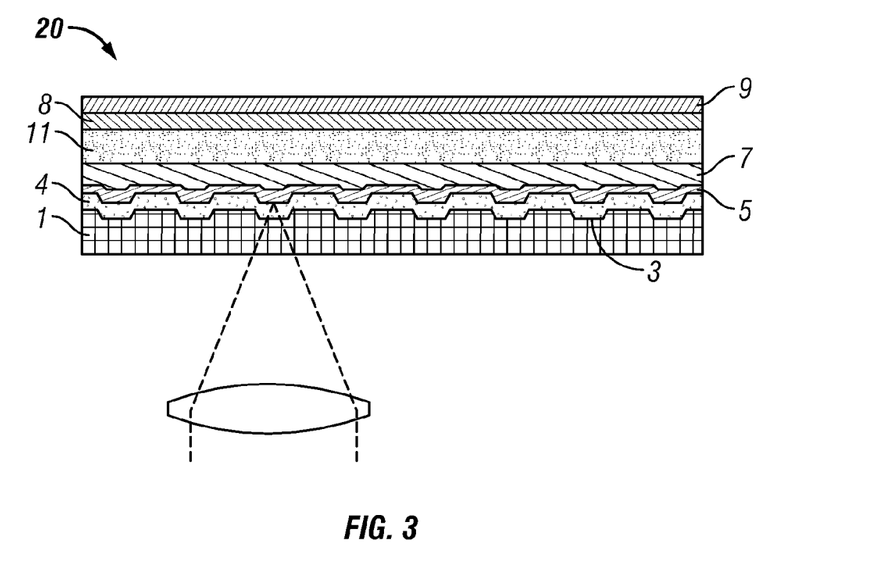
FIG. 3 is a longitudinal sectional view of the principal parts showing the internal structure of the second embodiment of the disc-shaped information recording medium according to the invention.

In the next place, a second embodiment of the disc-shaped information recording medium of the invention will be explained with referring to FIG. 3. FIG. 3 is a longitudinal sectional view of the principal parts showing the internal structure of the write once type DVD (DVD-R), as disc-shaped information recording medium 20, which is an example of a second embodiment.

Information recording medium 20 of the second embodiment is a disc-shape as a whole. Information recording medium 20 has printing part P equipped with colored underlayer 8 and ink receipt layer 9 in this order on the principal surface of one side of optical penetrating substrate 1 in the center of which is formed a hole not shown in the Figure. Further, ink receipt layer 9 may comprise inorganic fine particles, a binder and a crosslinking agent. When ink receipt layer 9 is measured with a mercury porosimetry method, the pore diameter distribution of the gap has a maximum peak in the range of 30 nm or more.

Optical penetrating substrate 1 may be formed of a transparent resin, for example, polycarbonate, and the like by injection molding. A clamping area may be provided on the outside of hole 2 of the principal surface of one side of substrate 1. The outer peripheral side of the clamping area is an information record region (data record region). Guide groove 3 for use as a tracking guide is formed in the data record region. The pitch of guide groove 3 may vary and is 0.74 μm in, for example, DVD.

In the next place, a dye solution of an organic dye such as a phthalocyanine dye or a cyanine dye may be coated by means of, for example, spin coating method, on the principal surface of one side of optical penetrating substrate 1 on which guide groove 3 is formed, and dried. Thus, recording layer 4 comprising an organic dye film is formed. Further, on recording layer 4, reflective layer 5, which may comprise a metallic film of silver alloy or the like, is formed. Moreover, another substrate 11 comprising a transparent resin such as polycarbonate or the like is stuck via an adhesive layer 7 which may comprise an ultraviolet curing property resin layer obtained by using an ultraviolet curing property resin or the like formed all over the surface extending from the inner periphery to the outer periphery of substrate 1 so as to cover reflective layer 5. And on the principal surface of one side of substrate 11 where record light and reproduction light do not come in, printing part P equipped with colored underlayer 8 and ink receipt layer 9 in this order may be formed similarly to the first embodiment. Data recording part D is composed of optical penetrating substrate 1, recording layer 4 and reflective layer 5. Recording or reproduction of data information is performed by irradiating data recording part D with laser beams from the other principal surface side of optical penetrating substrate 1, i.e. from the side opposite printing part P.

Substrate 11 is generally called a dummy substrate, which does not necessitate an optical penetration property functionally. Accordingly, when a colored substrate is used as substrate 11, ink receipt layer 9 can be formed without using underlayer 8. On the other hand, it is preferred that adhesion of substrate 11 onto data recording part D is performed with, e.g., an ultraviolet curing property adhesive, at relatively low temperature and in relatively a short time. Therefore, similarly to optical penetrating substrate 1, it is preferred for substrate 11 to be composed of a transparent resin material, e.g., polycarbonate or the like.

From the above reason, in disc-shaped information recording medium 20 of the second embodiment also, underlayer 8 may be colored white with, e.g., a pigment. Specifically, underlayer 8 may be formed by coating a coating liquid obtained by blending fine powders of inorganic pigments and organic materials as additives, with an ultraviolet curing property resin material and other resin materials, and if necessary adding thereto a solvent.

Further, in this embodiment also, ink receipt layer 9 may comprise inorganic fine particles, a binder and a crosslinking agent. In ink receipt layer 9, for example, the inorganic fine particle is alumina, the binder is polyvinyl alcohol, and the crosslinking agent is a boron compound. Ink receipt layer 9 may be formed by preparing a coating liquid by adding vapor-phase method inorganic fine particles to an ultraviolet curing property resin material or other resin material, and further adding other additives, and coating the resulting coating liquid on underlayer 8 by, for example, a spin coating method, and drying the coated layer. Ink receipt layer 9 may be a single layer, or may comprise a plurality of layers.

Further, the invention is sufficiently applicable to disc-shaped information recording media recordable or reproducible with short wavelength laser beams of, e.g., from 360 to 450 nm.

Figure 4:
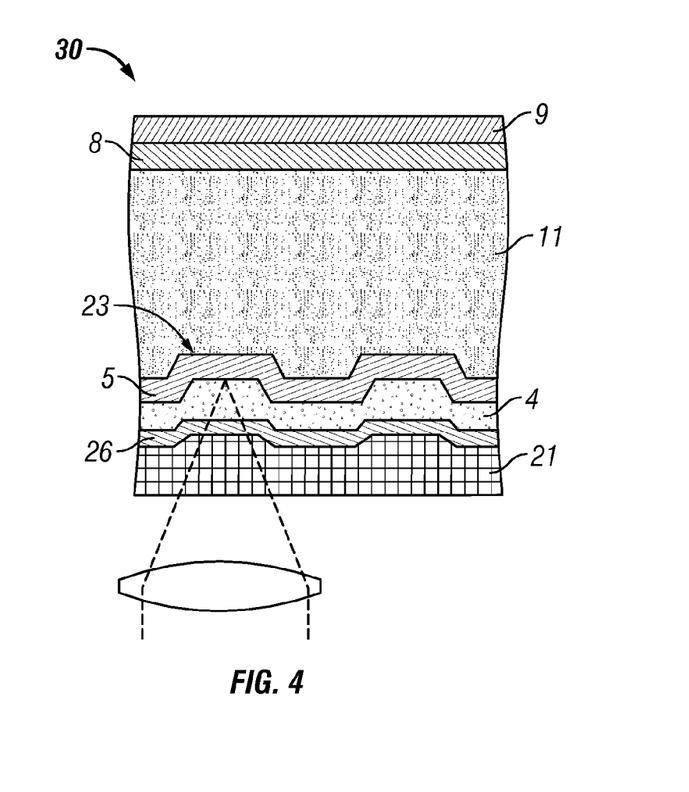
FIG. 4 is a longitudinal sectional view of the principal parts showing the internal structure of the third embodiment of the disc-shaped information recording medium according to the invention.

In the next place, a third embodiment of the disc-shaped information recording medium of the invention will be explained with referring to FIG. 4. FIG. 4 is a longitudinal sectional view of the principal parts showing the internal structure of the write once type BD (BD-R), as disc-shaped information recording medium 30, which is an example of a third embodiment.

Information recording medium 30 of the third embodiment is a disc-shape as a whole. Information recording medium 30 has printing part P equipped with colored underlayer 8 and ink receipt layer 9 in this order on the principal surface of one side of optical transparency layer 21 in the center of which is formed a hole not shown in the Figure. Further, ink receipt layer 9 may comprise inorganic fine particles, a binder and a crosslinking agent. When ink receipt layer 9 is measured with a mercury porosimetry method, the pore diameter distribution of the gap has a maximum peak in the range of 30 nm or more.

Construction of data recording part D of disc-shaped information recording medium 30 of this embodiment is carried out in a procedure different from that in the first embodiment.

In the present embodiment, substrate 11 having a thickness t of 1.1 µm and a diameter of 120 mm is formed with a resin material, e.g., polycarbonate, polymethyl methacrylate, or the like, by injection molding, for example. On the principal surface of other side of substrate 11, spiral-shaped guide groove 23 is formed in a pitch of, e.g., 0.32 µm or 0.35 µm as integral construction at the time of injection molding of substrate 11. On the principal surface of substrate 11 on which guide groove 23 is formed, reflective layer 5 composed of a metallic film of, e.g., silver alloy, is formed. Further, recording layer 4 which may comprise a dye film may be formed by coating a dye solution obtained by dissolving an organic dye such as an azo dye or a cyanine dye in TFP (tetrafluoropropanol) solution, by means of a spin coating method, for example, so as to cover reflective layer 5, and drying. Further, by forming a film of an inorganic material such as $Nb_2O_5$—$Al_2O_3$ system complex oxide or the like with, e.g., an RF sputtering device so as to cover organic dye layer 4, interlayer 26 may be formed. Further, by coating an ultraviolet curing property transparent resin material such as acrylic resin or the like by means of, e.g., a spin coating method so as to cover interlayer 26, and curing by UV irradiation, optical transparency layer 21 having a thickness of 0.1 mm may be formed. And printing part P equipped with colored underlayer 8 and ink receipt layer 9 in this order is formed on the principal surface of one side of substrate 11, similarly to the first embodiment.

Optical transparency layer 21 corresponds to optical penetrating substrate 1 in the first and second embodiments. Further, optical transparency layer 21 can also be formed by sticking sheets having a thickness of less than 0.1 mm (for example, 0.075 mm) comprising a transparent resin material, e.g., polycarbonate, with an ultraviolet curing property adhesive. In such a case, it is preferred that the thickness in total of the adhesive layer and the sheet be 0.1 mm.

Data recording part D consists of optical transparency layer 21, recording layer 4, and reflective layer 5. Recording or reproduction of data information is performed by irradiating data recording part D with laser beams from the other principal surface side of optical transparency layer 21, i.e. the side opposite printing part P.

Substrate 11 does not functionally necessitate an optical penetration property similarly to substrate 11 in the second embodiment. Accordingly, when a colored substrate is used as substrate 11, ink receipt layer 9 can be formed without using underlayer 8. In the present embodiment, the thickness of substrate 11 is 1.1 mm similarly to optical penetrating substrate 1 in the first embodiment and it accounts for almost all the disc-shaped information recording medium. For the purpose of the reduction of environmental load, recycling of substrate 11 is earnestly desired. Accordingly, it is preferred for substrate 11 to be formed of transparent resin material such as polycarbonate similarly to optical penetrating substrate 1.

From the above reason, in disc-shaped information recording medium 30 of the third embodiment also, underlayer 8 may be colored white with, e.g., a pigment. Specifically, underlayer 8 may be formed by coating a coating liquid obtained by blending fine powders of inorganic pigments and organic materials as additives, with an ultraviolet curing property resin material and other resin materials, and if necessary adding thereto a solvent.

Further, in this embodiment also, ink receipt layer 9 may comprise inorganic fine particles, a binder and a crosslinking agent. In ink receipt layer 9, for example, the inorganic fine particle is alumina, the binder is polyvinyl alcohol, and the crosslinking agent is a boron compound. Ink receipt layer 9 may be formed by preparing a coating liquid by adding vapor-phase method inorganic fine particles to an ultraviolet curing property resin material or other resin material, and further adding other additives, and coating the resulting coating liquid on underlayer 8 by, for example, a spin coating method, and drying the coated layer. Ink receipt layer 9 may be a single layer, or may comprise a plurality of layers.

The preferred embodiment of the inorganic fine particles is as follows. That is, as the inorganic fine particles, silica, boehmite, aluminum oxide (alumina), titanium oxide ($TiO_2$), barium sulfate, calcium silicate, zeolite, kaolinite, talc, calcium carbonate, magnesium carbonate, calcium sulfate and the like are exemplified. Alumina that can be obtained by a vapor-phase method is especially preferred.

As the inorganic fine particles, it is preferred to use inorganic fine particles having an average primary particle diameter of approximately 17 nm or more. However, the invention is not restricted thereto, and when the coating liquid for ink receipt layer contains a coagulant, inorganic fine particles having an average primary particle diameter of less than 17 nm may be used.

The measurement of an average primary particle diameter is as follows. For example, fine particles are photographed with an electron microscope, the major axis diameter of each particle is measured from the obtained particle photograph, and the average value is found.

The preferred embodiment of the binder is as follows. That is, aqueous resins are preferred as the binder. As the aqueous resins, e.g., polyvinyl alcohol-based resins and cellulose-based resins are preferred, and polyvinyl alcohol-based resins are more preferred.

The preferred embodiment of the crosslinking agent is as follows. That is, the crosslinking agent can be selected and used from a boron compound, an aldehyde-based compound, a ketone system compound, a halogen-based compound, an active vinyl compound, an N-methylol compound, a melamine compound, and an epoxy compound. Of these compounds, a boron compound is preferably used for crosslinking of polyvinyl alcohol.

As the boron compounds, e.g., borax, boric acid, borate, diborate, and metaborate can be exemplified. Of these boron compounds, borax, boric acid and borate are preferred for capable of rapidly causing cure reaction, and borax is more preferred.

The preferred embodiment of the coagulant is as follows. That is, when inorganic fine particles having an average primary particle diameter of smaller than 17 nm are used as the inorganic fine particles, it is preferred for the coagulant to be added and mixed with the coating liquid for ink receipt layer. As the coagulants, ionic polymers, for example, a cationic system polymer, an anionic polymer, and a nonionic polymer, salts, and pH adjustors are exemplified.

As the cationic system polymers, e.g., polymers having any of primary to tertiary amino groups and a quaternary ammonium salt, polyethyleneimine, polyvinylamine, polyallylamine, polyvinylpyridine, polyamidine, and cationic polysaccharide are exemplified. As the quaternary ammonium salts, e.g., dimethyldiallylammonium chloride and the like are exemplified.

As the anionic polymers, e.g., polyacrylic acid, polymethacrylic acid, polystyrenesulfonic acid, acrylic acid-styrene copolymers, styrene-maleic anhydride copolymers and the like are exemplified.

As the nonionic polymers, e.g., polyethylene glycol (PEG), block copolymers of PEG and polyethylene, polyvinyl pyrrolidone, polyacrylamide, celluloses (and derivatives thereof), and the like are exemplified.

As the salts, e.g., NaCl, magnesium sulfate, sodium nitrate, lithium chloride, sodium citrate, and the like are exemplified.

As the pH adjustors, acidic substances, e.g., magnesium sulfate ($Mg_2SO_4$), nitric acid, sulfuric acid, hydrochloric acid, acetic acid, lactic acid, and the like, and basic substances, e.g., sodium hydroxide, potassium hydroxide, sodium carbonate, ammonia aqueous solution, and the like are exemplified.

The invention will be described with reference to examples and comparative examples applied to write once type CD (CD-R) as the disc-shaped information recording media.

EXAMPLE 1

Optical penetrating substrate 1 made of polycarbonate having an outer diameter of 120 mm, an inner diameter of 15 mm, and a thickness of 1.2 mm, and having formed spiral-shaped guide groove of a half band width of 0.5 µm, depth of 0.2 µm, and a tracking pitch of 1.6 µm in the range of the diameter of from 46 to 117 mm is prepared.

On the surface of the penetrating substrate 1 on which guide groove 3 is formed, a cyanine dye dissolved in a solvent is coated by a spin coating method and dried to form recording layer 4 comprising an organic dye film having an average film thickness of 70 nm. Silver is sputtered on recording layer 4 to form reflective layer 5 having a thickness of 100 nm. Further, ultraviolet curing property resin SD-318 (manufactured by Dainippon Ink and Chemicals Inc.) is coated thereon by a spin coating method and cured by irradiation with UV to form protective layer 6 having a thickness of 10 µm. Thus, a write once type CD (CD-R) is obtained as disc-shaped information recording medium 10.

In the next place, ultraviolet curing property ink for white underlayer (UV-31125ZT WHITE, manufactured by Teikoku Printing Inks Mfg. Co., Ltd.) is coated on protective layer 6 on one principal surface of the CD-R by a screen printing method in a range of the diameter of from 23 to 118 mm, cured by UV irradiation to form white colored underlayer 8.

And then, coating liquid for an ink receipt layer A is prepared by mixing 4.2 parts of polyvinyl alcohol (JP-50, manufactured by JAPAN VAM & POVAL CO., LTD.) as the binder, 25.2 parts of vapor-phase method alumina (Alu-C, an average primary particle diameter: 13 nm, manufactured by AEROSIL CO., LTD.) as the inorganic fine particles, 0.042 parts of borax as the crosslinking agent, and as other additives, 0.4 parts of lactic acid, 0.2 parts of nitric acid, 0.25 parts of $ZrO(NO_3)_2.2H_2O$, 0.5 parts of glycerol, and 69.2 parts of ion exchange water.

As a coagulant comprising a cationic system polymer, 1 g of dimethyldiallylammonium chloride (manufactured by DAI-ICHI KOGYO SEIYAKU CO., LTD.) is added to and mixed with 99 g of coating liquid for ink receipt layer A to prepare a first coating liquid for an ink receipt layer containing the coagulant. The coating liquid is coated on underlayer 8 of the CD-R by a spin coat method in the range of the diameter of from 23 to 118 mm, and the obtained coating film is heated and dried at 60° C. to obtain a sample of disc-shaped information recording medium 10 of Example 1 comprising optical penetrating substrate 1 having on one principal surface of which colored underlayer 8 and ink receipt layer 9 having a thickness of 25 µm in this order.

EXAMPLE 2

As a coagulant comprising a nonionic system polymer, 1 g of polyethylene glycol (PEG)-polyethylene (PE) block copolymer (manufactured by Aldrich) is added to and mixed with 99 g of coating liquid for ink receipt layer A to prepare a second coating liquid for an ink receipt layer containing the coagulant. The coating liquid is coated on underlayer 8 of the CD-R by a spin coat method in the range of the diameter of from 23 to 118 mm, and the obtained coating film is heated and dried at 60° C. to obtain a sample of disc-shaped information recording medium 10 of Example 2 comprising optical penetrating substrate 1 having on one principal surface of which colored underlayer 8 and ink receipt layer 9 having a thickness of 25 μm in this order.

EXAMPLE 3

As a coagulant comprising a salt, 0.2 g of NaCl is added to and mixed with 99 g of coating liquid for ink receipt layer A to prepare a third coating liquid for an ink receipt layer containing the coagulant. The coating liquid is coated on underlayer 8 of the CD-R by a spin coat method in the range of the diameter of from 23 to 118 mm, and the obtained coating film is heated and dried at 60° C. to obtain a sample of disc-shaped information recording medium 10 of Example 3 comprising optical penetrating substrate 1 having on one principal surface of which colored underlayer 8 and ink receipt layer 9 having a thickness of 25 μm in this order.

EXAMPLE 4

As a coagulant comprising a pH adjustor, 0.2 g of $MgSO_4$ is added to and mixed with 99 g of coating liquid for ink receipt layer A to prepare a fourth coating liquid for an ink receipt layer containing the coagulant. The coating liquid is coated on underlayer 8 of the CD-R by a spin coat method in the range of the diameter of from 23 to 118 mm, and the obtained coating film is heated and dried at 60° C. to obtain a sample of disc-shaped information recording medium 10 of Example 4 comprising optical penetrating substrate 1 having on one principal surface of which colored underlayer 8 and ink receipt layer 9 having a thickness of 25 μm in this order.

EXAMPLE 5

As the binder, 4.2 parts of polyvinyl alcohol (JP-50, manufactured by JAPAN VAM & POVAL CO., LTD.), 25.2 parts of vapor-phase method alumina (Alu-65, an average primary particle diameter: 17 μm, manufactured by AEROSIL CO., LTD.) as the inorganic fine particles, 0.042 parts of borax as the crosslinking agent, and as other additives, 0.4 parts of lactic acid, 0.2 parts of nitric acid, 0.25 parts of ZrO $(NO_3)_2 \cdot 2H_2O$, 0.5 parts of glycerol, and 69.2 parts of ion exchange water are mixed to prepare a fifth coating liquid for ink receipt layer.

The fifth coating liquid for ink receipt layer is coated on underlayer 8 of the CD-R by a spin coat method in the range of the diameter of from 23 to 118 mm, and the obtained coating film is heated and dried at 60° C. to obtain a sample of disc-shaped information recording medium 10 of Example 5 comprising the optical penetrating substrate having on one principal surface of which colored underlayer 8 and ink receipt layer 9 having a thickness of 25 μm in this order.

COMPARATIVE EXAMPLE

In the next place, coating liquid for ink receipt layer. A is coated on underlayer 8 of the CD-R by a spin coat method in the range of the diameter of from 23 to 118 mm, and the obtained coating film is heated and dried at 60° C. to obtain a sample of disc-shaped information recording medium 10 of Comparative Example comprising optical penetrating substrate 1 having on one principal surface of which colored underlayer 8 and ink receipt layer 9 having a thickness of 25 μm in this order.

With respect to each of ink receipt layers 9 on colored underlayers 8 in the samples of disc-shaped information recording medium 10 of Examples 1 to 5 and Comparative Example, the pore diameter distribution of the gaps is measured by a mercury porosimetry method with Pore Master 60GT (PM 60GT-11, manufactured by Quantachrome Instruments). Pore diameter can be measured by the Pore Master 60GT based on the applied pressure necessary to force mercury through a pore of a given diameter. Using the Washburn equation ($D = (-4\gamma \cos \theta)/P$; where P is the applied pressure, D is the pore diameter, γ is the surface tension of the mercury (480 dyne $cm^{-1}$), and θ is the contact angle between the mercury and the pore wall, which is generally taken to be 140 degrees), a pore diameter distribution can be determined by monitoring the volume of intruded mercury as a function of pressure. The results obtained (maximum peak) are shown in Table 1 below.

Figure 5:
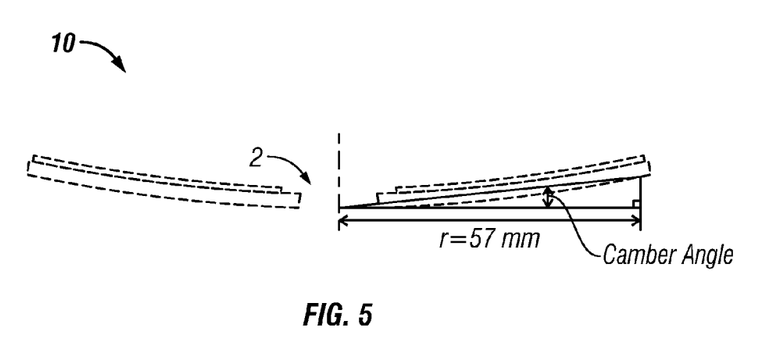
FIG. 5 is a view showing the camber angle of the disc-shaped information recording medium.

Further, with respect to each of the samples of disc-shaped information recording medium 10 of Examples 1 to 5 and Comparative Example, the camber angle (degrees) is measured with an optical disc camber angle automatic measuring device (S2HH-20N, manufactured by Nihondensikogaku Co., Ltd.), taking the substrate center on the principal surface of the other side of the optical penetrating substrate at the outer peripheral edge part of ink receipt layer 9 (radius of 57 mm from the center) of the sample of disc-shaped information recording medium 10 as reference point, as shown in FIG. 5. Ten sheets of samples are measured at 18×36 points every sample. The measured values are simply averaged, and the results obtained are shown in Table 1.

TABLE 1

| Sample No. | Coagulant | Inorganic Fine Particle | Average Primary Particle Diameter (nm) | Peak of Pore Diameter Distribution (nm) | Camber Angle (deg) |
|---|---|---|---|---|---|
| Example 1 | Dimethyldiallylammonium chloride | Alu-C | 13 | 38.0 | 0.14 |
| Example 2 | PEG-PE copolymer | Alu-C | 13 | 30.1 | 0.16 |
| Example 3 | NaCl | Alu-C | 13 | 31.0 | 0.15 |
| Example 4 | $MgSO_4$ | Alu-C | 13 | 34.8 | 0.12 |
| Example 5 | Nothing | Alu-65 | 17 | 37.0 | 0.10 |
| Comparative Example | Nothing | Alu-C | 13 | 25.8 | 0.20 |

Figure 6:
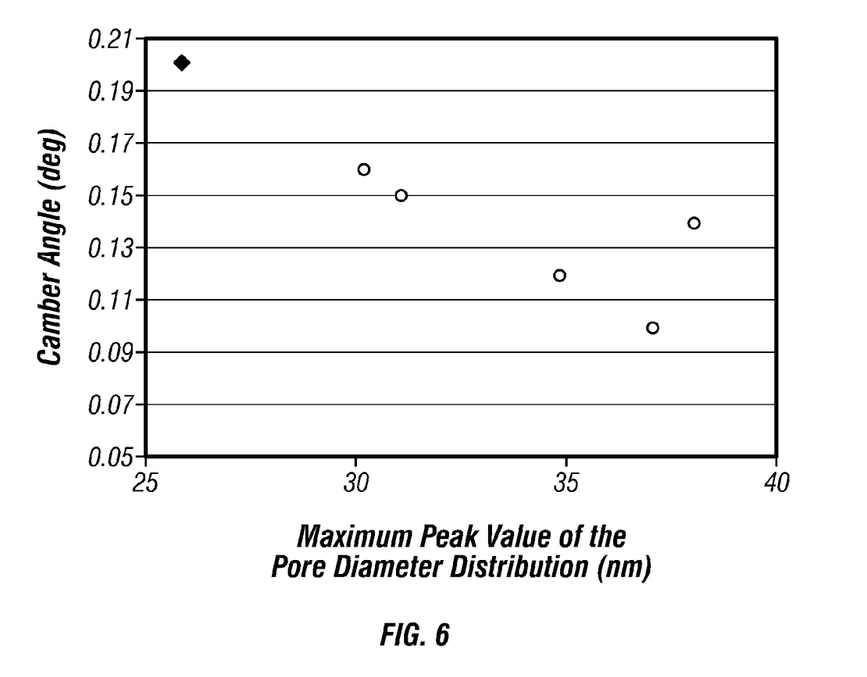
FIG. 6 is a graph showing the results of measurement of the diameters of maximum peaks of the pore diameter distributions of the gaps of the ink receipt layers by a mercury porosimetry method and camber angles of the disc-shaped information-recording media in Examples 1 to 5 of the invention and Comparative Example.

Further, with respect to each of the samples of disc-shaped information recording medium 10 of Examples 1 to 5 and Comparative Example, the value of maximum peak of the pore diameter distribution of the gap is taken on the axis of abscissas, and the camber angle of the sample of disc-shaped information recording medium 10 is taken on the axis of ordinate, and shown in FIG. 6.

As is apparent from FIG. 6, in disc-shaped information recording medium 10 in Comparative Example wherein ink receipt layer 9 is formed with coating liquid for ink receipt layer A, the pore diameter distribution of the gap has a maximum peak at 25.8 nm, and the camber angle is 0.20°. Contrary to this, in disc-shaped information recording media 10 in Examples 1 to 5, the pore diameter distribution of the gap of every sample has a maximum peak at 30 μm or more and the camber angle is restrained to 0.16° or less, so that it can be seen that the generation of warp is restrained as compared with the sample of Comparative Example.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A disc-shaped information recording medium comprising an optical penetrating substrate having a colored underlayer and an ink receipt layer in this order on the principal surface of one side of the substrate, wherein the ink receipt layer contains an inorganic fine particle, a binder, and a crosslinking agent, and wherein a pore diameter distribution of gaps in the ink receipt layer have a maximum peak in the range of 30 nm or more when the ink receipt layer is measured with a mercury porosimetry method, said ink receipt layer comprising a salt or pH adjustor as a coagulant for coagulating particles constituting the inorganic fine particle, said salt or pH adjuster being selected from the group consisting of NaCl, magnesium sulfate, sodium nitrate, lithium chloride, sodium citrate, magnesium sulfate, nitric acid, sulfuric acid, hydrochloric acid, acetic acid, lactic acid, sodium hydroxide, potassium hydroxide, sodium carbonate, and ammonia aqueous solution.

2. The disc-shaped information recording medium of claim 1, wherein the colored underlayer comprises a substrate distinct from the optical penetrating substrate.

3. The disc-shaped information recording medium of claim 1, wherein the colored underlayer is formed from a dried coating liquid comprising inorganic pigments blended with an ultraviolet curing resin material.

4. The disc-shaped information recording medium of claim 1, wherein the inorganic fine particle has a primary particle diameter of approximately 17 nm or more.

5. The disc-shaped information recording medium of claim 1, wherein a thickness of the ink receipt layer is from about 4 μm to about 100 μm.

6. The disc-shaped information recording medium of claim 5, wherein the thickness of the ink receipt layer is from about 10 μm to about 32 μm.

7. The disc-shaped information recording medium of claim 1, wherein the ink receipt layer comprises a vapor-phase method alumina.

8. The disc-shaped information recording medium of claim 1, wherein the medium has a camber angle of less than 20 degrees.

9. The disc-shaped information recording medium of claim 8, wherein the medium has a camber angle of approximately 0.16 degrees or less.

10. A method of manufacturing an information recording medium comprising forming a colored underlayer on the principal surface of one side of a disc-shaped information recording medium, and forming an ink receipt layer by coating a coating liquid comprising an inorganic fine particle, a binder, and a crosslinking agent on the underlayer and drying the coating liquid, wherein the coating liquid comprises a coagulant which is a salt or pH adjustor for coagulating particles constituting the inorganic fine particle, said salt or pH adjuster being selected from the group consisting of NaCl, magnesium sulfate, sodium nitrate, lithium chloride, sodium citrate, magnesium sulfate, nitric acid, sulfuric acid, hydrochloric acid, acetic acid, lactic acid, sodium hydroxide, potassium hydroxide, sodium carbonate, and ammonia aqueous solution.

11. The method of manufacturing of claim 10, wherein the coating liquid comprises an alumina fine particle, polyvinyl alcohol and a boron compound.

12. The method of manufacturing of claim 10, wherein forming a colored underlayer comprises coating and drying a liquid comprising inorganic pigments blended with an ultraviolet curing resin material.

13. The method of manufacturing of claim 10, wherein the coating liquid comprises an inorganic powder added to an ultraviolet curing resin material.

14. The method of manufacturing of claim 13, wherein the inorganic powder comprises a vapor-phase method alumina.

15. The method of manufacturing of claim 14, wherein the vapor-phase method alumina accounts for about 200 to about 2,000 weight percent of the coating liquid as compared to the resin.

16. A method of manufacturing an information recording medium comprising a process of forming a colored underlayer on the principal surface of one side of a disc-shaped information recording medium, and forming an ink receipt layer by coating a coating liquid comprising an inorganic fine particle, a binder, and a crosslinking agent on the underlayer, wherein an inorganic fine particle having an average primary particle diameter of approximately 17 nm or more is used in the coating liquid for ink receipt layer, said coating liquid further comprising a salt or pH adjustor as a coagulant for coagulating particles constituting the inorganic fine particle, said salt or pH adjuster being selected from the group consisting of NaCl, magnesium sulfate, sodium nitrate, lithium chloride, sodium citrate, magnesium sulfate, nitric acid, sulfuric acid, hydrochloric acid, acetic acid, lactic acid, sodium hydroxide, potassium hydroxide, sodium carbonate, and ammonia aqueous solution.

17. The method of manufacturing an information recording medium as claimed in claim 16, wherein the coating liquid comprises an alumina fine particle, polyvinyl alcohol and a boron compound.

18. The method of manufacturing of claim 16, wherein the coating liquid comprises a vapor-phase method alumina added to an ultra-violet curing resin material, and wherein the vapor-phase method alumina accounts for around 500 weight percent of the coating liquid as compared to the resin.

19. The method of manufacturing of claim 16, wherein a viscosity of the coating liquid is from about 350 to 8,100 mPa·s.

20. The disc-shaped information recording medium of claim 1, wherein the inorganic fine particle is constituted by the coagulated particles whose average primary particle diameter is less than 17 nm.

* * * * *